(12) United States Patent
Hickman et al.

(10) Patent No.: US 7,389,800 B2
(45) Date of Patent: Jun. 24, 2008

(54) ORIENTATION-INDEPENDENT FLUID DELIVERY APPARATUS

(75) Inventors: Scott Noble Hickman, Ventura, CA (US); James M. Cegelski, Grover Beach, CA (US); James Fahey, Oceano, CA (US)

(73) Assignee: Accessories Marketing, Inc., Grover Beach, CA (US)

( * ) Notice: Subject to any disclaimer, the term of this patent is extended or adjusted under 35 U.S.C. 154(b) by 116 days.

(21) Appl. No.: 11/090,765

(22) Filed: Mar. 25, 2005

(65) Prior Publication Data

US 2006/0217662 A1 Sep. 28, 2006

(51) Int. Cl.
 *B65B 1/04* (2006.01)
(52) U.S. Cl. .............................. 141/26; 141/38; 141/44; 141/67; 141/286; 222/282
(58) Field of Classification Search ............... 141/4, 141/21–27, 38, 44, 67, 68, 250, 286, 314, 141/316; 222/105, 251, 282
See application file for complete search history.

(56) References Cited

U.S. PATENT DOCUMENTS

| | | | | |
|---|---|---|---|---|
| 4,109,831 A | * | 8/1978 | Culpepper et al. | 222/254 |
| 5,096,092 A | * | 3/1992 | Devine | 222/95 |
| 5,333,660 A | * | 8/1994 | Kohlmann et al. | 141/263 |
| 6,283,172 B1 | * | 9/2001 | Thurner | 141/38 |
| 6,651,702 B2 | * | 11/2003 | Marino | 141/26 |
| 6,712,238 B1 | * | 3/2004 | Mills | 222/61 |
| 6,789,581 B2 | | 9/2004 | Cowan et al. | 141/38 |

FOREIGN PATENT DOCUMENTS

| | | |
|---|---|---|
| WO | WO 99/14031 | 3/1999 |
| WO | WO 03/041949 | 5/2003 |
| WO | WO 2004/041649 | 5/2004 |
| WO | PCT/US2006/010864 | 3/2007 |

* cited by examiner

*Primary Examiner*—Timothy L Maust
(74) *Attorney, Agent, or Firm*—DLA Piper US LLP

(57) ABSTRACT

A fluid delivery device that may be used in any orientation is presented. The device includes a container, a first fluid in the container space, an inlet opening attached to a bladder, and an outlet opening. A second fluid enters the container through the inlet opening. The bladder, which receives the second fluid as it enters the container, expands with the amount of second fluid that is received. As more of the second fluid is received and the bladder expands, the first fluid is pushed out of the container through the outlet opening. The device may be used as a tire repair system, for example by coupling the inlet opening to an air compressor and coupling the outlet tube to a tire. The first fluid that's in the container space would be a sealant composition in this case. Different embodiments of the bladder are possible depending on the application.

20 Claims, 11 Drawing Sheets

ORIENTATION-INDEPENDENT FLUID DELIVERY APPARATUS

FIELD OF INVENTION

This invention relates generally to a fluid dispensing apparatus and particularly to a sealant dispensing apparatus that is designed to dispense a fluid from a fluid container in any orientation.

BACKGROUND

Fixing a flat tire for most vehicle operators has traditionally involved the use of a spare tire and the complex and dangerous process of installing it. The procedure for installing a spare tire can take up to an hour and requires that the driver pull safely to the side of the road, locate the tools, raise the vehicle using the tools, remove the damaged tire and replace it with spare wheel assembly that was being carried in the vehicle. After the spare wheel assembly is securely on, the driver lowers the vehicle and stows the damaged wheel assembly somewhere in or on the vehicle. These steps, which are used to fix a flat tire regardless of ambient temperature, time of day, and weather conditions, are usually unpleasant, challenging and sometimes dangerous to the driver. To a driver who is not experienced with tire replacement, the process can take an undue amount of time and frustration. Furthermore, this tire replacement process exposes the motorist to inherent roadside dangers.

Recently, various products have emerged to address the task of emergency tire repair and do not require the installation of a spare tire. These products include run-flat tires, liquid tire sealants, and aerosol tire sealants, to name a few. However, all of these products have drawbacks and many introduce significant challenges and danger to the average motorist.

Liquid tire sealants with unique fluid dispensing methods have been proposed. These fluid dispensing methods fall into two categories; (1) Aerosol dispensers which are comprised on compressed gas as a propellant integrated with a liquid sealant in a container and (2) Two-part liquid sealant installation kits that are comprised of a stand-alone compressed air source which can be attached to a liquid sealant container to force the liquid sealant into a tire.

Aerosol dispensers combine a chemical fluid to be dispensed with a propellant. The propellants are usually contained in a can or other type of container. A tube is attached between the can and a tire via a tire valve stem. The fluid is propelled to the tire through the tube, and into the tire through the valve stem. When the fluid reaches the punctured area of the tire, it hardens due to exposure to air. The hardened fluid forms a temporary, and in some cases a permanent, repair "patch" on the tire.

This "tire-patching" method helps eliminate some of the problems associated with replacing the punctured tire with a spare tire, such as the need to carry around a large spare wheel assembly. However, this method does not lessen the roadside danger to which the driver is exposed. In some cases, such as in the case of some commercially available aerosol tire sealants, use of the method may even pose new dangers that are not posed by the traditional spare tire method. For example, the amount of propellant in the can may not be enough to properly and safely inflate the tire to the recommended air pressure level. When an insufficient amount of propellant is used, the driver ends up operating a vehicle with a partially inflated tire. A partially-inflated tire is known to not only compromise the handling and the general maneuverability of the vehicle during vehicle operation, but also to cause premature tire failure. Of further concern is that the propellant in most aerosol sealants is highly combustible and may explode when exposed to higher temperature, or ignite when exposed to a flame.

An alternative method to tire repair is the Two-part system. The two parts include a fluid sealant and a compressed air source. The compressed air source allows proper and safe inflation of the tire, and conveniently allows tire repair without raising the car. The two-part system also leads to safe handling and control of the vehicle by allowing the tires to be inflated to the proper pressure. The Two-part systems do not expose the motorist to the above risks that are posed by the aerosol sealants.

Potential advantages of this two part system have not been fully realized for various reasons. Most Two-part systems require the air from the compressor to be forced into the sealant container through an intake. This results in the sealant being forced out of the container and into the tire through the exhaust outlet. This design tends to be potentially unreliable. For example, this type of system frequently does not dispense the sealant unless the outlet is immersed in a fluid. These type of designs will only work in certain specific orientations, compromising the reliability of the device and creating inconvenience to the user.

Another disadvantage of the two-part system is that it mixes air with fluid. In many cases, it is not desirable to mix a chemical with air, which usually contains some water vapor. Mixing air containing water vapor causes the chemical composition of the fluid to change. This change can be dramatic depending on the amounts of air, water vapor, and fluid that are involved.

Yet another disadvantage of the two-part system is the hardening of the chemical sealant after use. While being dispensed, the sealant can contact outlet surfaces and harden, forming a layer of hardened sealant on the surfaces. Since the hardened sealant is not easily removable, these hard-coated parts of the dispensing device usually require replacement. Replacement of the dispenser parts is inconvenient for the user. Moreover, the overall cost is increased and the reliability of the product is lowered because the need to incorporate replaceable parts adds to the complexity of design.

International patent WO2004/041649 (Cowan) and U.S. Pat. No. 6,789,581 (Cowan 2004) describe a container of fluid tire sealant with an intake and an exhaust. An air source supplies compressed air to the sealant container through the intake. The resulting pressure in the container pushes the sealant through an exhaust and into the punctured tire. A downside of this method is the limitation on the fluid container orientation. To effectively transfer the sealant to the tire, the exhaust has to be covered by the sealant inside the container. If the container is oriented so that the exhaust is above the sealant, only air will be pumped. Further, the air will be mixed with the fluid in this orientation. This mixing can change the fluid chemical composition without any fluid being dispensed. Also, after use, the outlet of the device becomes contaminated with hardened sealant.

International patent WO 03/041949 (Eriksen 2002) describes another variation of this pressurized container method. In this method, the compressed air does not actually enter the sealant container. It fills and pressurizes a cavity around the sealant container. The sealant container has a movable piston at one end. The pressurized cavity causes this piston to push against the sealant in the container. The resulting pressure forces the sealant through an exhaust into a punctured tire.

In WO 03/041949, a cap covering both the sealant container and the pressurized cavity serves as a valve. This cap-valve allows the system to operate simply as a compressor passing air. This cap-valve alternately allows pressurized sealant to be injected into a punctured tire. Although this method seems to be advantageous because it allows orientation-independent operation, it has its drawbacks. The combination of sealant container, cavity, and cap-valve increases complexity. This complexity increases the cost of the device and compromises system reliability. The portion of the cap-valve that comes into contact with the sealant must be replaced after use. Sealant will harden when exposed to air or moisture. This portion of the cap-valve becomes useless due to hardened sealant.

International patent WO 99/14031 (Thurner, 1999) describes a container of sealant fluid that is inside of a pressure chamber. During use, the chamber is pressurized. This pressurizing compresses the sealant container, forcing the sealant through an outlet. A disadvantage with this design is that it does not allow orientation-independent operation. Plus, this design requires incorporation of replaceable parts because of hardened sealant on the outlet parts. Moreover, since the container is compressed during use, it has to be replaced after use. Depending on the chemical composition of the fluid, it may be hazardous for the user to come into contact with the fluid. If the container does not compress completely, the sealant that remains in the container may come in contact with the user during the container-removal process.

As described above, most Two-part tire repair methods that are currently available have their disadvantages. A tire repair method that is inexpensive for the user (e.g., minimal replaceable parts required) and convenient to use (e.g., orientation-independent) is desired.

SUMMARY

In one aspect, the invention is a fluid delivery device that includes a container that defines a container space, a first fluid in the container space, an inlet opening attached to a bladder, and an outlet opening. A second fluid enters the container space through the inlet opening, and the bladder receives the second fluid and expands as the second fluid enters the container space through the inlet opening. The first fluid exits the container through the outlet opening as more of the container space is occupied by the second fluid.

In another aspect, the invention is a system for dispensing a fluid. The system includes a housing, an inlet tube and an outlet tube fixed in the housing, a container containing a first fluid, and a bladder attached to the inlet tube. The container is disengageably attached to the housing such that the container receives a second fluid from the inlet tube and the first fluid exits the container through the outlet tube in response to the container's receiving of the second fluid. The bladder receives the second fluid and expands inside the container.

In another aspect, the invention is a kit for dispensing fluid. The kit includes a cap having an inlet tube and an outlet tube, an inlet connector for connecting the inlet tube to a compressor, and a bladder coupled to the inlet tube so that the bladder can receive a fluid from the inlet tube. The bladder expands as it receives the fluid. The kit further includes an outlet tube for connecting the outlet tube to an object in need of repair, and a container of sealant that is couplable to the cap such that the sealant exits the container through the outlet tube as the bladder expands.

In yet another aspect, the invention is a method of delivering a fluid. The method entails providing a container holding a first fluid, wherein the container has an outlet opening, and inflating a bladder inside the container such that inflation of the bladder forces the first fluid to pass through the outlet opening.

The invention is also a fluid delivery device that includes a container having a first chamber and a second chamber, a first fluid in the first chamber, and a second fluid in the second chamber. There are a first inlet opening through which a third fluid enters the first chamber and a second inlet opening through which the third fluid enters the second chamber. A first bladder in the first chamber is attached to the first inlet opening such that the first bladder receives the third fluid and expands as the third fluid enters the first chamber through the first inlet opening. A second bladder in the second chamber is attached to the second inlet opening such that the second bladder receives the third fluid and expands as the third fluid enters the second chamber through the second inlet opening. The first chamber has a first outlet opening through which the first fluid exits the first chamber as the first bladder expands, and the second chamber has a second outlet opening through which the second fluid exits the second chamber as the second bladder expands.

DETAILED DESCRIPTION

Embodiments of the invention are described herein in the context of tire repair and inflation. However, it is to be understood that the particular application provided herein is just an exemplary application, and the fluid delivery system of the invention is not limited to the application or the embodiments disclosed herein. For example, the fluid delivery system of the invention may be used with a paint sprayer to spray a predetermined amount of paint and automatically follow with a stream of air to accelerate drying, with a coating system, fluid injection system, oiling system, etc.

The fluid delivery system of the invention uses an inflatable bladder inside a fluid container (e.g., a sealant container). This bladder is connected to an inlet through which a replacement fluid (e.g., air) is received. The bladder expands as the replacement fluid fills it. As the bladder expands, it conforms to the shape of the fluid container and forces more of the fluid that was originally in the container out of the container. Eventually, when the bladder expands to the approximate size of the container space, substantially all of the original fluid has been transferred out of the container through an outlet.

The fluid delivery system of the invention is not limited to positioning the fluid container in a particular orientation. Due to the fact that the bladder expands and conforms to the shape of the container space, substantially all of the fluid that was originally in the container will be forced out when the bladder reaches its maximum expansion.

The bladder keeps the original fluid and the replacement fluid separated. Where the original fluid is a sealant and the replacement fluid is air, the bladder prevents the air (with water vapor) from changing the composition of the chemical sealant. Thus, the chemical composition of the original fluid is never compromised.

The system of the invention is simple, inexpensive, and reliable. The bladder itself does not significantly increase the manufacturing cost because it may be made of inexpensive elastic material. The user saves money because the entire assembly may be reused, and no replacement of outlet parts is required after each use. Parts exposed to the chemical fluid may be discarded in an appropriate recycling repository. The entire assembly can be made from recyclable materials.

Figure 1:
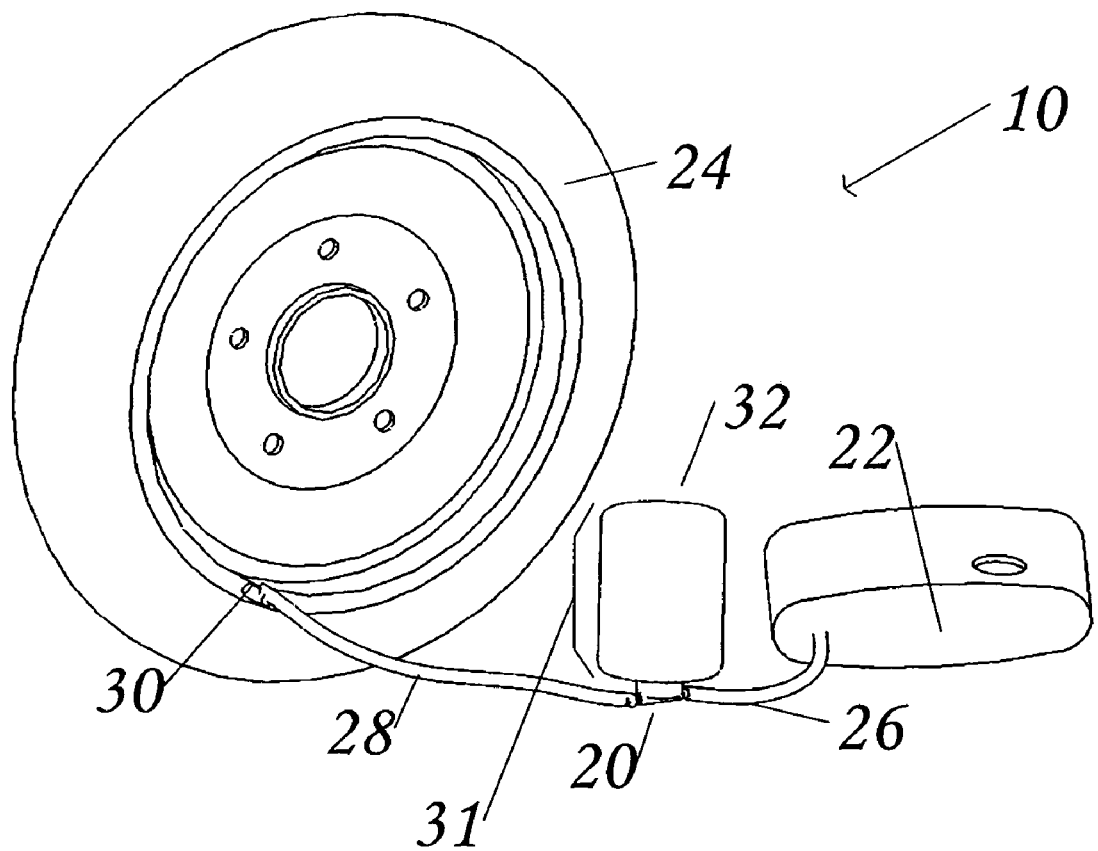
FIG. 1 is an overall view of an exemplary fluid delivery system that is used for tire repair.

FIG. 1 is an overall view of an exemplary fluid delivery system 10 that is used for tire repair. The fluid delivery system 10 includes a delivery device 31, which includes a cap 20 and a container 32. The container 32, which holds the sealant fluid that is to be delivered to the tire 24, is attached to the cap 20. When the system 10 is used, the delivery device 31 is connected to both a compressor 22 and the target object being repaired, which in this case is a tire 24. More specifically, an inlet connector 26 is used for connecting a compressor 22 to the delivery device 31, and an outlet connector 28 is used for connecting the delivery device 31 to a valve stem 30 on the tire 24. The compressor 22 may be any conventional, commercially available compressor, such as a standard 12V automotive air compressor.

During the operation of the system 10, air is supplied by the compressor 22 to the delivery device 31 through the inlet connector 26. The air that enters the container 32 via the cap 20 inflates a bladder (see FIG. 3) inside the container 32. As the bladder expands, it takes up an increasing amount of space inside the container 32 and pushes the sealant fluid out of the container 32. The sealant fluid flows out of the container 32 through the outlet connector 28, and enters the tire 24 via the valve stem 30. After substantially all the sealant fluid in the container 32 has been transferred out of the container 32, air enters the tire 24 through the outlet connector 28 to inflate the tire 24. In this way, a predetermined amount of sealant fluid is delivered to the tire 24 before air is used to inflate it. Any commercially available tire sealant fluid may be used with the system 10.

Figure 2:
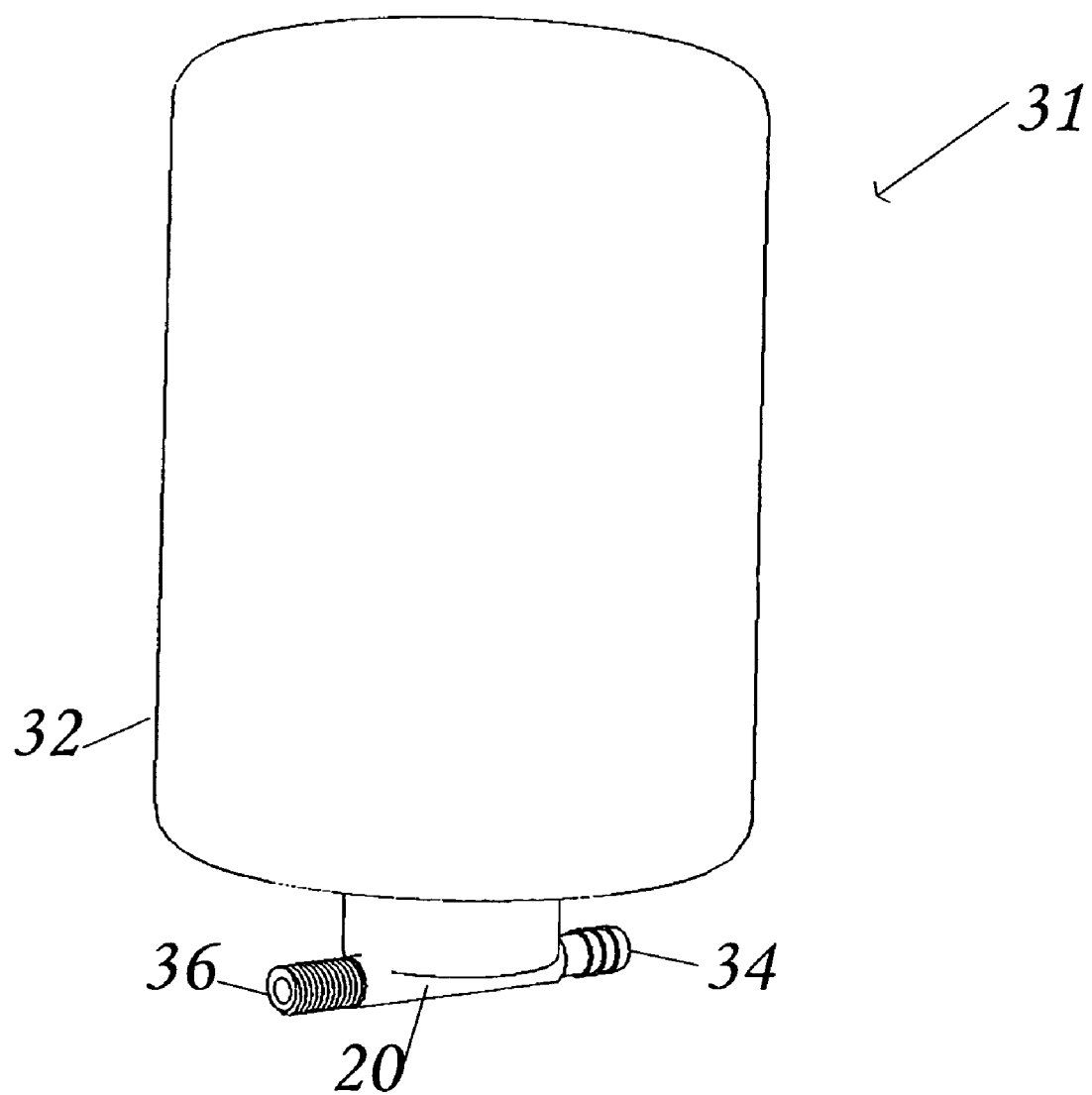
FIG. 2 is a perspective view of the delivery device including the cap connected to the sealant bottle.

FIG. 2 is a perspective view of the delivery device 31 including the cap 20 connected to the sealant bottle 32. The cap 20 has an outlet fitting 34 and an inlet fitting 36. The inlet fitting 36, the outlet fitting 34, and the cap 20 may be formed as one piece. Alternatively, the inlet fitting 36 and the outlet fitting 34 may be screw-in fittings. The container 32 can be made of any material (flexible or non-flexible, soft or hard) that can hold the sealant fluid and is convenient for transporting. As shown, the outlet fitting 34 has a different pattern thereon than the inlet fitting 36. The different fitting patterns are used to ensure that the user of the system 10 does not connect the compressor 22 and the tire 24 to the wrong ends of the cap 20.

Figure 3A:
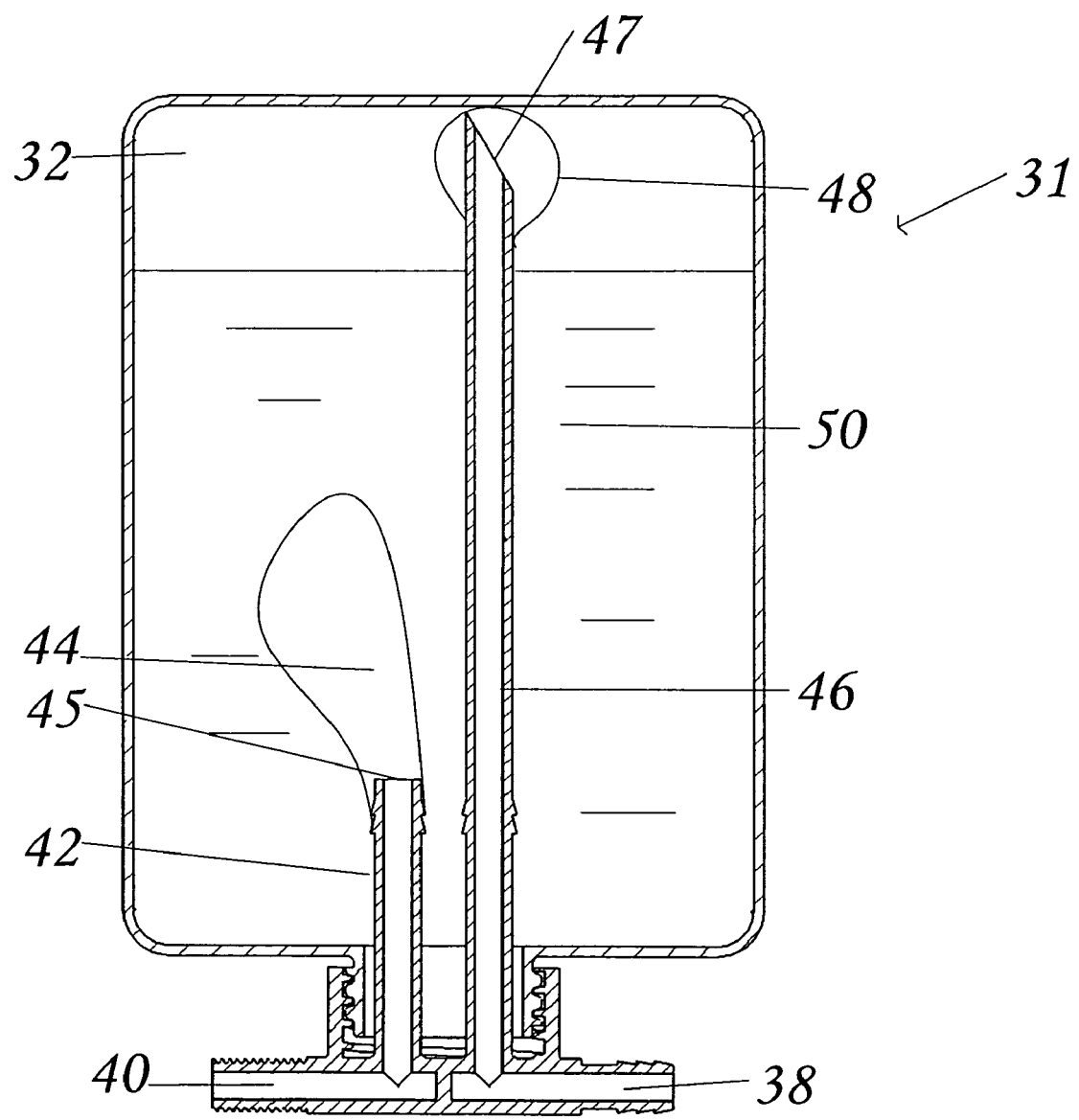
FIG. 3A is a cross-sectional view of the delivery device of FIG. 2.

FIG. 3A is a cross-sectional view of the delivery device 31 of FIG. 2, which includes the cap 20 connected to the sealant bottle 32. The outlet fitting 34 has an outlet passage 38, and the inlet fitting 36 has an inlet passage 40. The inlet passage 40 is connected to a first end of an inlet tube 42, and a second end of the inlet tube 42 is connected to a bladder 44. The second end of the inlet tube 42 has an inlet opening 45 through which air enters the container 32 (more specifically, the bladder 44). The bladder 44 may be made of any flexible, expandable material that does not allow significant air permeation, including but not limited to polymer/rubber products, latex, nitrile, neoprene, or some other elastic material. For example, vulcanized natural rubber may be used to make the bladder 44. The outlet passage 38 is connected to a first end of an outlet tube 46, and a second end of the outlet tube 46 is connected to a screen 48. The second end of the outlet tube 46 has an outlet opening 47 through which fluids exit the container 32. A sealant fluid 50 is in the container 32. In this embodiment, the second end of the outlet tube 46 is positioned above the fluid level in the container 32, thus preventing the sealant fluid 50 from flowing into the outlet tube 46 until the bladder 44 is inflated enough to push up the fluid level to the height of the outlet tube 46.

Figure 3B:
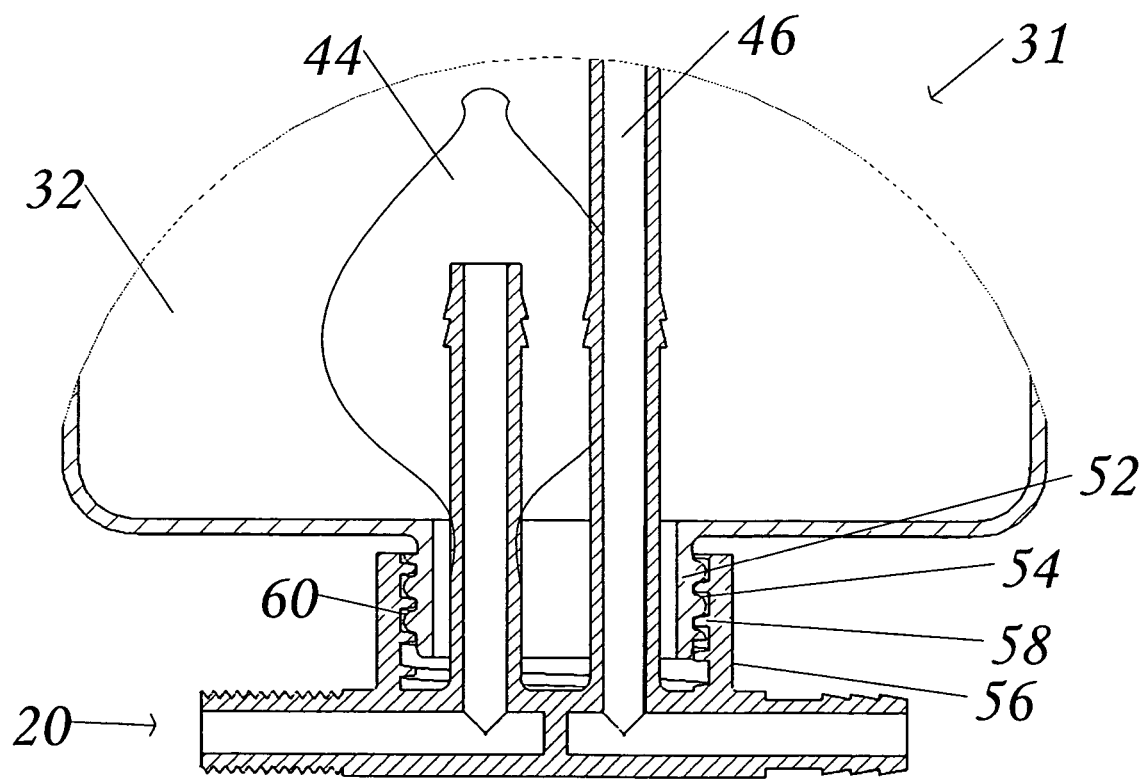
FIG. 3B is a cross-sectional view of the delivery device focusing on the junction of the cap and the container.

FIG. 3B is a cross-sectional view of the delivery device 31 focusing on the junction of the cap 20 and the container 32. The container 32 has a neck 52 with threads 54 that is used to securely couple the container 32 to the cap 20. The cap 20 has a wall 56, and the inner surface of the wall 56 has threads 58 that is designed to fit with the threads 54 on the container neck 52. In this embodiment, the neck 52 has a diameter that is smaller than the cross-sectional diameter of the wall 56 and threads into the wall 56. However, the invention is not so limited and the wall 56 may be designed to thread into the neck 52. A thread sealant 60 is used to secure the coupling between the cap 20 and the container 32 and to prevent undesirable leakage of fluids.

Figure 4A:
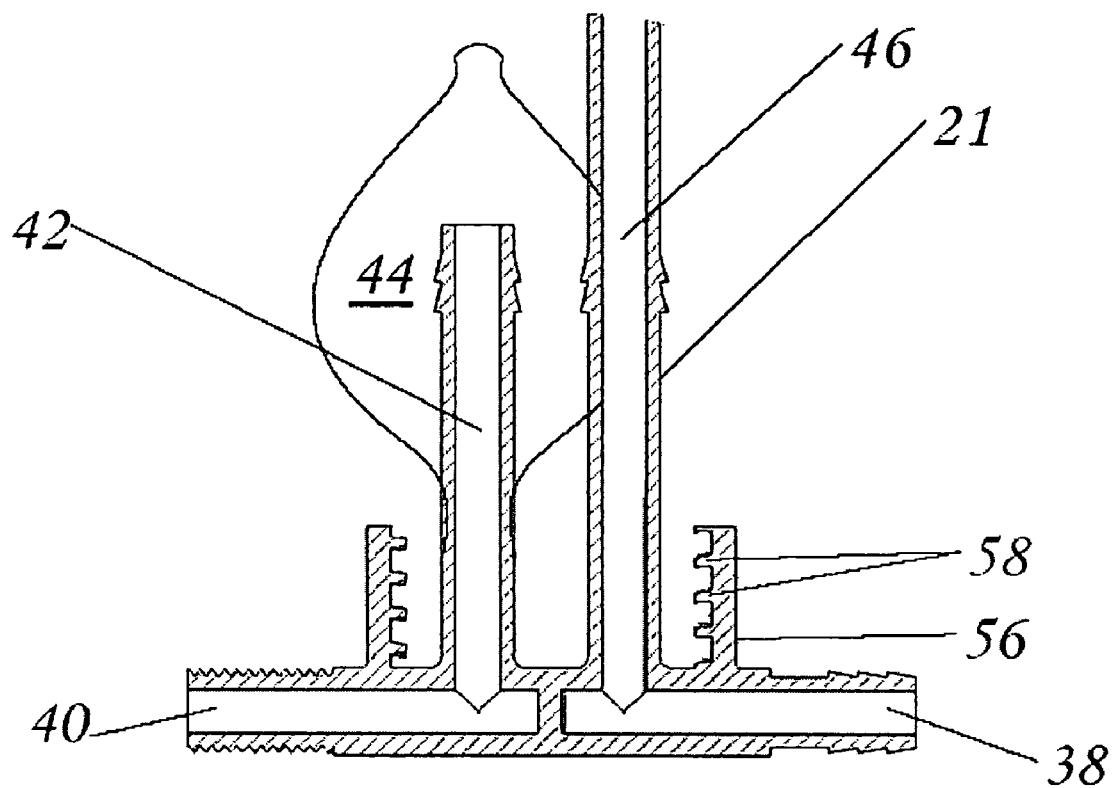
FIG. 4A is a cross-sectional view of the cap in accordance with the invention.
Figure 4B:
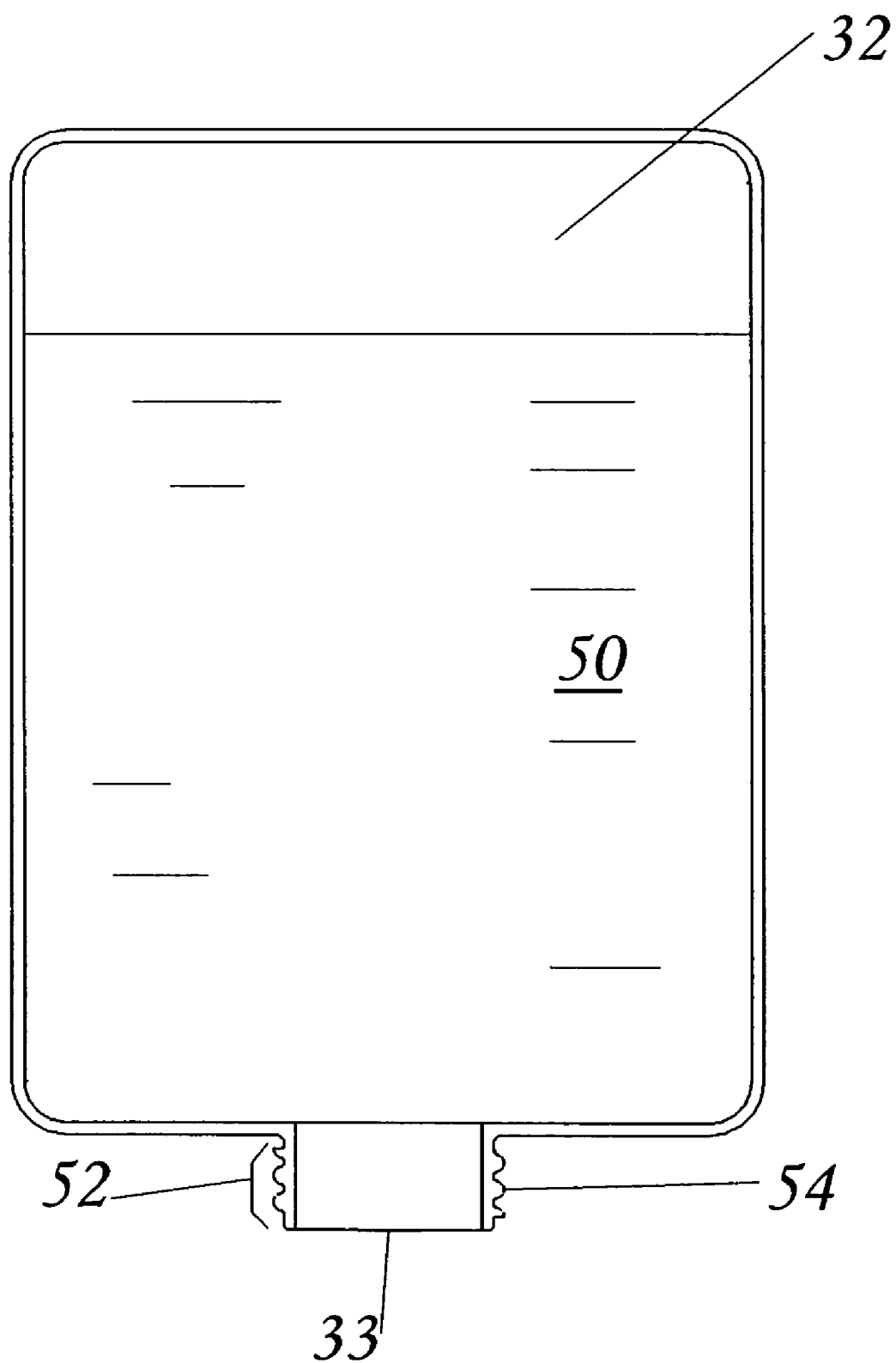
FIG. 4B is a cross-sectional view of the container that is suitable for being coupled to the cap of FIG. 4A.

FIG. 4A is a cross-sectional view of the cap 20 in accordance with the invention. The cap 20 includes a housing 21 that holds together the inlet passage 40, the inlet tube 42, the outlet passage 38, the outlet tube 46, and the wall 56. FIG. 4B is a cross-sectional view of the container 32 that is suitable for being coupled to the cap 20 of FIG. 4A. The container 32 is sealed when the container 32 is coupled to the cap 20.

Figure 5A:
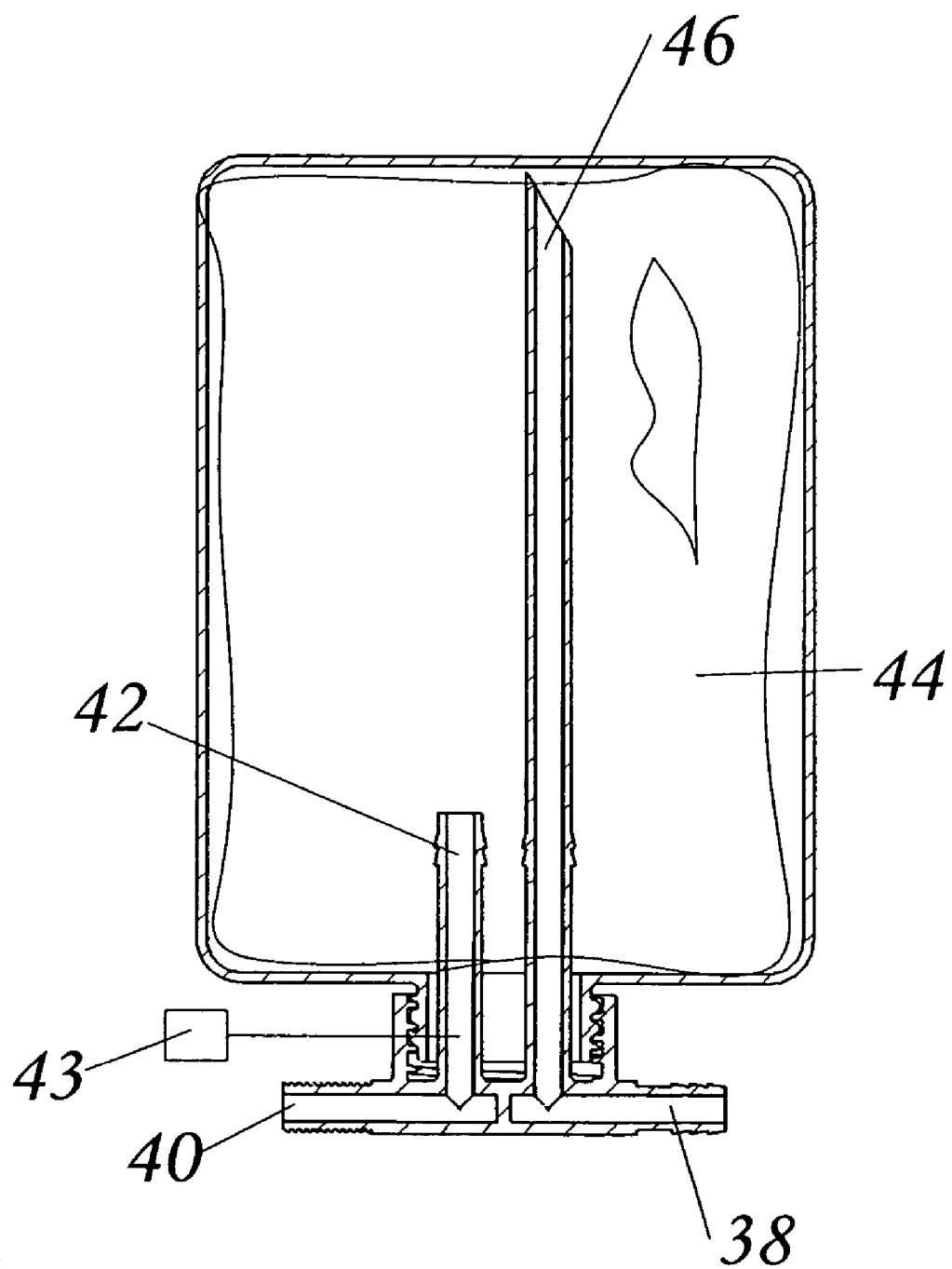
FIG. 5A is a cross-sectional view of the delivery device including a valve outside the container.

FIG. 5A is a cross-sectional view of the delivery device 31 having a valve 43 outside the container 32. The particular figure depicts the bladder 44 in a substantially fully-inflated state. A "fully inflated" state is when the bladder 44 has expanded to about the same size as the space inside the container 32 so that there is substantially no sealant fluid remaining in the container space. A "space" or "container space," as used herein, refers to the space inside the container and does not include the inlet tube 42 or the outlet tube 46. When the bladder 44 is inflated, it conforms to the shape of the space in the container 32. The bladder 44 is made of a flexible material that can expand around the outlet tube 46, and the presence of the outlet tube 46 does not interfere with bladder expansion.

After the bladder is fully inflated, the bladder may do a number of things, depending on the embodiment. In one embodiment, the bladder may be designed to withstand the pressure of the compressed air source, so that it simply remains inflated. A valve 43 may be coupled to the inlet tube 42 so that the bladder 44 maintains a predefined pressure level after it reaches the fully-inflated state. The valve 43 may be a pressure-relief valve that automatically opens once the pressure in the inlet tube 42 reaches a predefined level. While a bladder 44 that is designed to maintain the predefined pressure level may not be suitable for tire inflation, it is useful in that it allows the delivery of a pre-determined amount of fluid. When this type of bladder is used for tire repair and inflation, the user would need to inflate the tire after all the sealant is delivered to the tire 24, for example by connecting the compressor 22 to the tire 24. With this type of bladder, the bladder simply remains inflated until the compressor 22 is turned off. The entire delivery device 10, including the bladder 44, can be reused.

Figure 5B:
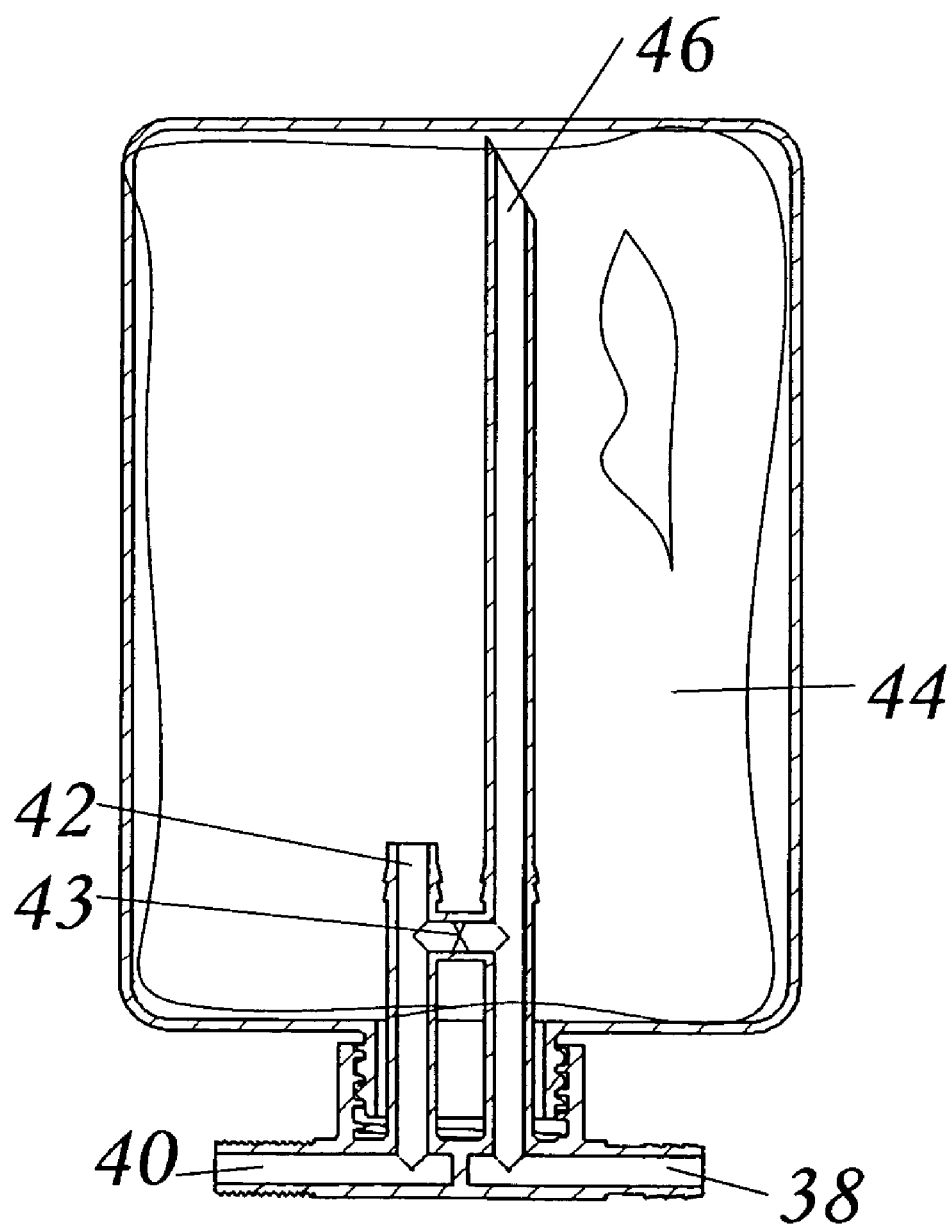
FIG. 5B is a cross-sectional view of the delivery device including a valve inside the container.

A pressure relief valve may be positioned inside the container 32, as shown in FIG. 5B. If the pressure relief valve 43 were located inside the container, one possible location for it is between the inlet tube 42 and the outlet tube 46. Until the predefined pressure level is reached inside the bladder and the inlet tube 42, the valve 43 will remain closed, keeping the inlet tube 42 and the outlet tube 46 separate. Once the predefined pressure level is reached, however, the valve 43 will open and let out the extra pressure through the outlet tube 46. Like the embodiment of FIG. 5A where the valve 43 is outside the container 32, this embodiment allows re-use of the system 10 by avoiding any damage to the bladder. Compressed air will be passed through the outlet tube 46 to perform useful tasks. Some of these useful tasks include inflation, drying, spreading, and texturing. When the valve 43 is located inside the container 32, the delivery device 31 may be used for tire repair and inflation because it will deliver the sealant fluid 50 first and then the air.

The pressure relief valve 43 can be of any simple or conventional design. For example, it may be a pressure relieving connection between the inlet and the bladder.

In an alternative embodiment, the bladder may be designed to burst once it reaches a "critical size" or a predefined pressure level. The critical size is preferably approximately equal to the size of the container space. After the bladder bursts, compressed air passes directly from the inlet tube 42 to the outlet tube 46. Thus, after the bladder bursts, the compressed air may be used to inflate the tire 24. Alternatively, the compressed air may be used to texture or dry a coated object.

The screen 48, which surrounds the outlet opening 47 of the outlet tube 46, prevents clumps or debris (e.g., pieces of the burst bladder) from entering the outlet tube 46 and potentially clogging the passage to the tire 24. The mesh size of the screen 48 is adjusted according to the exact composition of the sealant fluid, bladder material, air pressure, etc. The size of the screen 48 is selected so that even if the bladder debris or sealant clumps are caught at the screen 48, the opening to the outlet tube 46 will not be completely blocked. A person of ordinary skill in the art would understand how to make these decisions.

Figure 6:
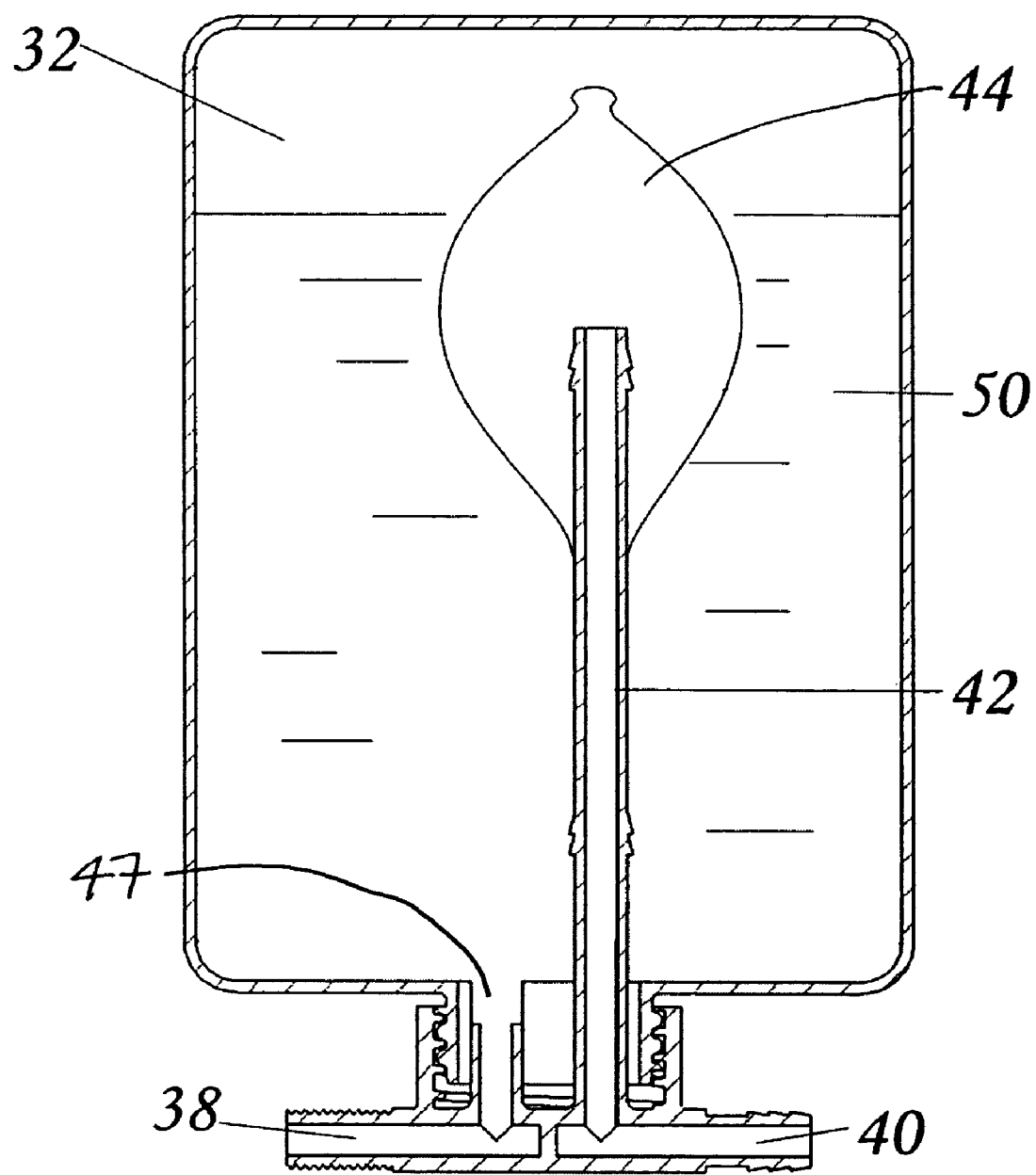
FIG. 6 is a cross-sectional view of an alternate embodiment of the delivery device.

FIG. 6 shows an alternate embodiment where the bladder 44 is located near the top of the container 32. This is different from the embodiment of FIG. 3, where the bladder 44 is located near the bottom of the container 32. The "top" of the container 32 is the section of the container that is farthest away from the cap 20 when the cap 20 and the container 32 are coupled. The "bottom" of the container 32 is the section of the container that is nearest to the cap 20 when the two parts are coupled. In the embodiment of FIG. 6, the sealant fluid 50 may flow into the outlet opening 47 before the compressor 22 is connected and turned on. However, there will be no significant flow of the sealant fluid 50 through the outlet passage 38 until the air pressure expands the bladder 44 and pushes the sealant fluid 50 out of the container space. A control valve (not shown) may be used to prevent the sealant fluid 50 from prematurely escaping the container 32 through the outlet opening 47.

Figure 7:
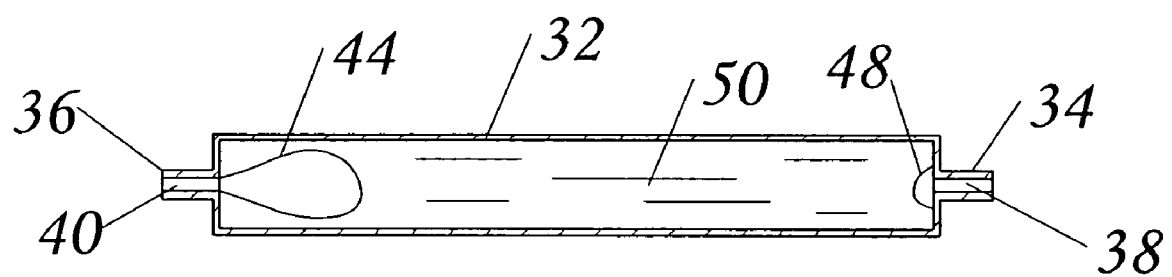
FIG. 7 is a cross-sectional view of yet another embodiment of the delivery device.

FIG. 7 shows an embodiment of the container 32 where the outlet passage 38 and the inlet passage 40 are at opposite ends of the container. The design of the cap 20 would have to be adjusted to accommodate the configuration of the container 32. For example, there is an inlet cap that connects the compressor 22 to the inlet passage 40, and an outlet cap that connects the outlet passage 38 to the tire valve stem 30 (see FIG. 1). This embodiment operates on the same principle as the embodiment of FIG. 3 and FIG. 6. The air flow inflates the bladder 44, which expands and pushes the sealant 50 out through the outlet passage 38. The screen 48 prevents undesirable debris or clumps from entering the outlet passage 38.

Figure 8:
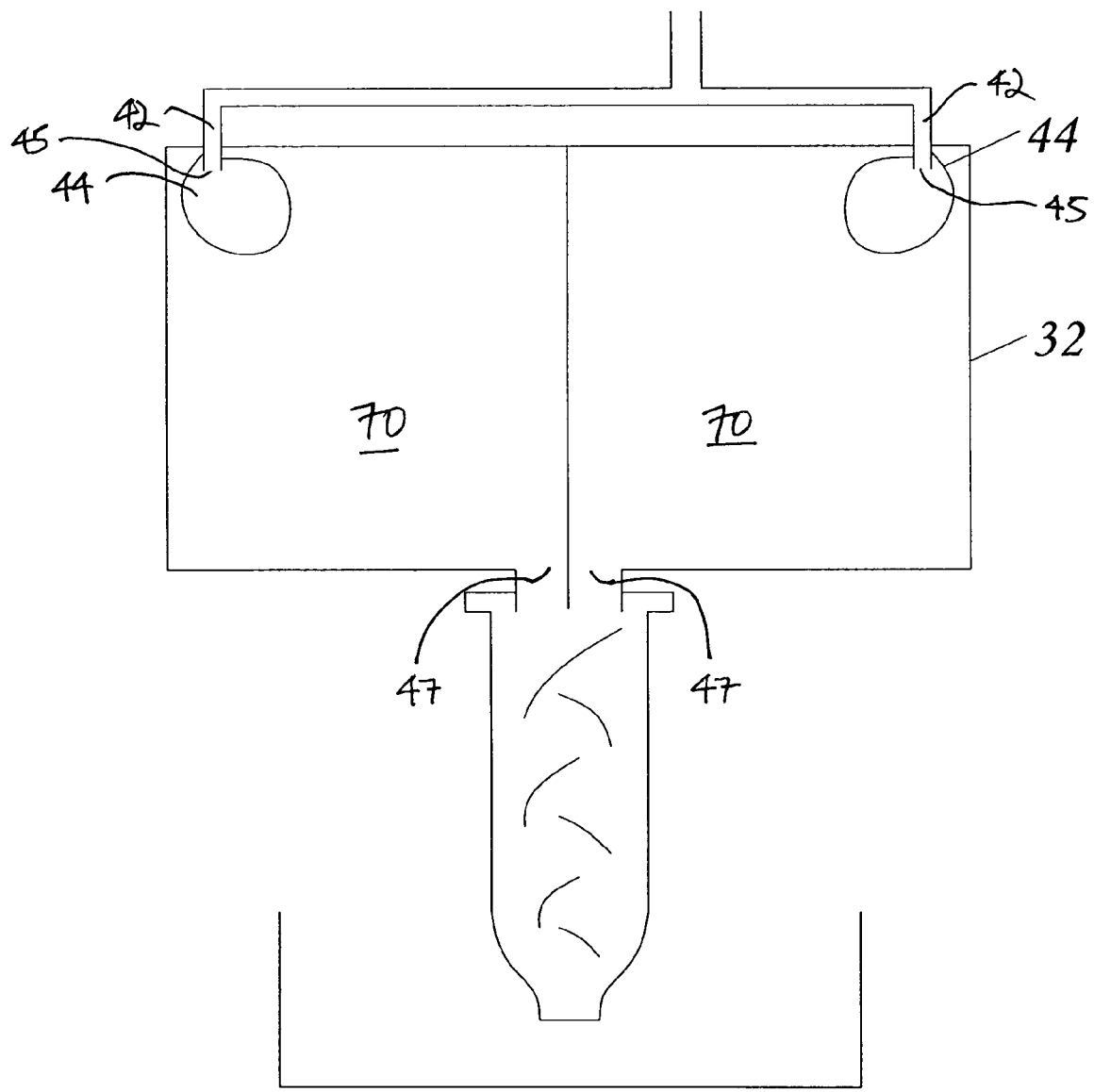
FIG. 8 is a cross-sectional view of a system that is adapted for multi-fluid application.

FIG. 8 is a cross-sectional view of a system 10 that is adapted for a multi-fluid application. For the multi-fluid application, the container 32 would have multiple chambers 70, each containing a pre-measured amount of a first fluid and a second fluid, respectively. Each chamber 70 has an inlet tube 42 and an outlet opening 47. The inlet tubes 42 are connected to a a source of a third fluid e.g., the compressor 22. Each chamber has a bladder 44 attached to the inlet openings 45 of the inlet tube 42. The outlet openings 47 are connected to a mixing chamber 70, for example by a mixing nozzle. When the compressor 22 is connected to the inlet tube 42 and turned on, the compressed air inflates the bladders 44. Each of the bladders 44 conforms to the respective chamber 70 in which they are located. The first and the second fluids in the chambers 70 are forced out by the each bladder 44 through the outlet openings 47. The first and the second fluids are deposited in the mixing chamber 72. If there is a mixing nozzle, the first and the second fluids are mixed by the mixing nozzle before or at the same time as entering the mixing chamber 72. In this way, accurately measured components of multi-part chemical systems may be dispensed. If desired, the components can be automatically mixed after dispensing. Alternatively, the components may be mixed by some other means after being dispensed. The chambers 70 may have different shapes and sizes, or they may be the same.

Another useful applications is dispensing of a chemical that must react with air. The chemical may be dispensed without mixing of air. Our device will then automatically provide a stream of air to cause the chemical to perform it's specific function.

Another useful application is dispensing of two or more part chemical reactants. These commonly include two part epoxies, urethanes, polyesters, silicones, or other multi-part chemical systems. The fluid container can be separated into multiple chambers. Each chamber includes its own bladder. The chambers can be different volumes depending on the chemical mix ratio. Compressed air inflates all bladders dispensing a correctly measured amount of chemical to be mixed.

The fluid delivery system and device of the invention overcome some of the problems associated with the conventional delivery systems. For example, the system 10 functions regardless of the exact orientation of the delivery device 31 because the bladder expansion forces substantially all the sealant out of the container regardless of orientation. Not having to position the delivery device in a certain way makes the device convenient for use. The bladder also makes the device safer to use, as it prevents the mixing of air and water vapor with the fluid, which can compromise the sealant composition. The fact that the bladder conforms to the shape of the container space ensures that a pre-measured amount of fluid will be dispensed completely, without significant amount of sealant being left over. There is no need for replacement of contaminated components after use, and the system automatically provides compressed air after delivering the sealant (if the right bladder type is used). The simplicity of design makes the system affordable and reliable, and all the more so because most of the parts can be recycled.

While the above description contains many specificities, these should not be construed as limitations on the scope of the invention. Rather, the descriptions are intended to provide examples of one or more preferred embodiments of the invention. Many other variations are possible. For example, the inlet and outlet fittings may be made removable. The cap can be mounted into a larger housing allowing ease of operation. This larger housing may also house the compressor, inlet, and outlet. The inlet and outlet may be located at any point of the container. The cap may be integral to the container and not a separate part.

Accordingly, the scope of the invention should be determined not by the embodiments illustrated, but by the appended claims and their equivalents.

The invention claimed is:

1. A fluid delivery device comprising:
   a container defining a container space;
   a first fluid in the container space;
   an inlet opening through which a second fluid enters the container space;
   a bladder in the container, wherein the bladder is attached to the inlet opening such that the bladder receives the second fluid and expands as the second fluid enters the container space through the inlet opening, wherein the bladder rips upon reaching a critical bladder volume such that the second fluid that enters the container through the inlet opening exits the container through the outlet opening; and
   an outlet opening in the container through which the first fluid exits the container as more of the container space is occupied by the second fluid.

2. The device of claim 1, wherein the bladder is expandable to the point where the second fluid substantially fills the container space.

3. The device of claim 1 further comprising a pressure relief valve coupled to the inlet opening, wherein the pressure relief valve maintains a pressure level of the second fluid in the container space at or below a predefined level.

4. The device of claim 1 further comprising a pressure relief valve in the container, wherein the pressure relief valve couples the inlet opening to the outlet opening if a pressure level of the second fluid in the container space reaches a predefined level.

5. The device of claim 1 further comprising:
   an inlet tube connected to the inlet opening, wherein the inlet tube is at least partially located in the container; and
   an outlet tube connected to the outlet opening, wherein the outlet tube is at least partially located in the container.

6. The device of claim 1 further comprising:
   an inlet tube connectable to the inlet opening; and
   an outlet tube connectable to the outlet opening;
   wherein the container is separable from the inlet tube and the outlet tube.

7. The device of claim 6, wherein the inlet tube and the outlet tube have different lengths.

8. The device of claim 1, wherein the bladder comprises a flexible polymer material.

9. The device of claim 1 further comprising a screen surrounding the outlet opening.

10. The device of claim 1, wherein the first fluid is a liquid and the second fluid is a gas.

11. The device of claim 1, wherein the first fluid is a sealant composition and the second fluid is air.

12. A system for dispensing a fluid, the system comprising:
    a housing;
    an inlet tube and an outlet tube fixed in the housing;
    a container containing a first fluid, wherein the container is disengageably attached to the housing such that the container receives a second fluid from the inlet tube and the first fluid exits the container through the outlet tube in response to the container's receiving of the second fluid; and
    a bladder attached to the inlet tube that receives the second fluid and expands inside the container, wherein the bladder rips upon reaching a critical bladder volume such that the second fluid that enters the container through the inlet tube exits the container through the outlet tube.

13. The system of claim 12 further comprising:
    a compressor; and
    an inlet connector disengageably connecting the compressor to the inlet tube to transfer the second fluid to the bladder.

14. The system of claim 13 further comprising as an outlet connector disengageably connecting the outlet tube to a target object in need of repair.

15. The system of claim 12, wherein the bladder is made of a vulcanized rubber material.

16. The system of claim 12, wherein the first fluid is a sealant composition and the second fluid is air.

17. The system of claim 12, wherein the first fluid is a liquid and the second fluid is a gas.

18. The system of claim 12 further comprising a screen attached to the outlet tube.

19. The system of claim 12, wherein the bladder is expandable to the point where the second fluid substantially fills the container.

20. The system of claim 12 further comprising a pressure relief valve coupled to the inlet tube, wherein the pressure relief valve maintains a pressure level of the second fluid in the container at or below a predefined level.

* * * * *